United States Patent [19]

Olson et al.

[11] 3,853,975
[45] Dec. 10, 1974

[54] CERAMIC PRODUCTION
[75] Inventors: Eugene E. Olson, Oakland; Ronald L. Clendenen, Orinda, both of Calif.
[73] Assignee: Shell Oil Company, Houston, Tex.
[22] Filed: Mar. 13, 1972
[21] Appl. No.: 234,399

[52] U.S. Cl. ................................. 264/82, 264/125
[51] Int. Cl. ............................................ C04b 15/14
[58] Field of Search ...... 264/66, 332, DIG. 58, 109, 264/82, 125

[56]  References Cited
 UNITED STATES PATENTS
 3,383,737  5/1968  Greger .............................. 264/332
 3,607,753  9/1971  Suchoff ....................... 264/DIG. 58
 3,723,587  3/1973  Iwase et al. .................. 264/DIG. 58

OTHER PUBLICATIONS
G. T. Oudemans, "Continuous Hot Pressing," Philips Technical Review, 1968, No. 2, at pp. 45–53.
P. E. Hart et al., "Densification Mechanisms in Hot–Pressing of Magnesia with a Fugitive Liquid," Feb., 1970, Jour. Amer. Cer. Soc., at pp. 83–86.
R. W. Rice, "Hot–Pressing of MgO with NaF," April, 1971, Jour. Amer. Cer. Soc. at pp. 205–207.
H. M. O'Brien, Jr. et al., "Microstructure Control In Nickel Ferrous Ferrite," Feb., 1969, Ceramic Bulletin at pp. 203–208.

Primary Examiner—Robert F. White
Assistant Examiner—J. R. Hall
Attorney, Agent, or Firm—Howard W. Haworth

[57]  ABSTRACT

When from 0.1 to 6 percent by weight of crystallite growth promoter is intimately combined with agglomerated less than 0.1 micron grains of ferric oxide and strontium oxide, barium oxide and/or lead oxide the resulting admixture may be formed into strontium, barium, and/or lead ferrite bodies having a surprisingly high degree of crystallite orientation by maintaining the admixture at a temperature of from 500°C to 900°C for a period of not more than 24 hours to cause the oxides to react together and form ferrite crystallites and then directly hot-pressing the crystallites into an oriented-crystallite body at a temperature of from 600°C to 1100°C and a pressure of from 1,000 psi to 30,000 psi.

14 Claims, No Drawings

CERAMIC PRODUCTION

BACKGROUND OF THE INVENTION

1. Field of the Invention

This invention relates to the production of highly oriented barium, strontium or lead ferrites which form excellent ceramic permanent magnets.

2. The Prior Art

Metal ferrites having a formula $MO \cdot nFe_2O_3$ wherein M is barium, strontium, or lead and n has a value of about 6, are known to yield permanent magnets.

Conventionally, ferrite magnets are prepared by an involved multistep process. First, the two individual metal oxides are calcined and reacted together to form a solid ferrite body. The resulting ferrite body is then ground up and ball milled into a fine powder. This powder is slurried in liquid and the slurry is placed in a magnetic field which orients the individual ferrite particles. While still aligned in the magnetic field, the slurry of particles is wet-pressed to form a compacted solid of oriented particles. This solid is dried and then thoroughly sintered. Finally it is magnetized to give the final ceramic magnet product. This process has several disadvantages. In addition to being complicated, it also does not produce magnets having optimum magnetic properties (remanences and intrinsic coercive forces), since it does not produce a fully crystallographically oriented material made up of uniform small crystallites.

Both desirable small particle size and a full orientation cannot be achieved using conventional techniques for two reasons: (1) orientation during wet-pressing requires large (2 micron or larger) particles to be fully effective, thus either orientation or particle size with their assorted magnetic properties must be sacrificed; and (2) it is impossible to both restrain crystallite growth during sintering and achieve desired high densities. Every effort is made in conventional productions to restrain crystallite growth, such as by careful control of sintering conditions.

Recently, other techniques for producing oriented ferrites for magnets have been discovered. In copending commonly assigned applications Ser. No. 183,838, now abandoned and Ser. No. 183,896, filed Sept. 27, 1971, by Clendenen, Olson and Schlaudt it is disclosed that ferrites having oriented crystallites may be produced by the four-step hot-pressing process of a. preparing small particles of agglomerated grains of ferric oxide and barium oxide, strontium oxide and/or lead oxide, b. thermally reacting the particles of agglomerated oxides to form tiny ferrite crystallites, c. sintering the crystallites into a solid body, preferably while applying pressure, and then d. in a separate step, hot-forging the body to orient the crystallites.

In this process, conditions were carefully controlled to limit crystallite growth, it being considered that (as in conventional processes) crystallite growth would be detrimental to the quality of the final product.

STATEMENT OF THE INVENTION

In contrast to these prior teachings, it has now been found that in hot-pressing techniques for producing oriented ferrites it is highly desirable to enhance crystallite growth. It has been found that when the rate of crystallite growth is enhanced by mixing a crystallite growth promoter with the metal oxides which make up the ferrite and then thermally reacting the oxides, a ferrite of oriented crystallite structure can be produced directly by hot-pressing; an additional hot-forging step being unnecessary.

More particularly, it has now been found that barium, strontium and/or lead ferrites having both small uniform grain size and a high degree of crystallographic orientation and thus capable of forming ceramic permanent magnets having both high intrinsic coercive forces and remanences are prepared by the process of:

a. preparing small solid particles which themselves comprise an intimate mixture of agglomerated less than 0.1 micron diameter grains of ferric oxide and one or more divalent metal oxides of the group strontium oxide, barium oxide and lead oxide, b. including with the solid particles, either by incorporation during the particle preparation or by a later separate addition, from about 0.1 to about 6 percent by weight, basis the solid particles, of a crystallite growth promoter, c. heating the admixture of agglomerated oxides and crystallite growth promoter at a temperature of from about 500°C to about 900°C for up to about 24 hours to cause the oxides to react (ferritize) and form small crystallites of divalent metal ferrite, and d. hot-pressing the crystallites directly into a solid body having an oriented crystallite structure by maintaining them at from 600°C to 1100°C while applying pressure.

DETAILED DESCRIPTION OF THE INVENTION

The Crystallite Growth Promoters and Their Addition

In accord with the process of this invention crystallite growth promoters are included with mixed oxide particles from which ferrite bodies eventually are formed.

The exact crystallite growth promoter or promoters employed is not critical and can be chosen from those known in the art, for example, the fluorides of Group IA and IIA metals of atomic number 3 through 56 inclusive, i.e., lithium fluoride, sodium fluoride, potassium fluoride, rubidium fluoride, cesium fluoride, beryllium fluoride, magnesium fluoride, calcium fluoride, strontium fluoride and barium fluoride.

A preferred group of crystallite growth promoters are the fluorides of Group IA and IIA metals having atomic number of from 3 through 38 inclusive. Most preferred as crystallite growth promoters are lithium fluoride and calcium fluoride. Combinations of crystallite growth promoters may be employed.

The amount of crystallite growth promoter added is generally controlled between about 0.1 percent by weight and about 4 percent by weight, based on the total weight of metal oxides. Amounts much less than 0.1 percent by weight do not give a rapid enough growth to achieve the unexpected crystallite orientation, while amounts of additive substantially greater than 6 percent by weight, since the additives are non-magnetic, can have adverse effects on the magnetic properties. Preferably from 0.25 to 2.0 percent by weight of crystallite growth promoters are employed.

The growth-promoting additives may be added as solid particles to previously prepared agglomerated oxide particles prepared in a preliminary step. If so added, the particles of additives should be small to permit their thorough admixture, preferably from 0.02 to 0.1 micron in diameter. The additives may also be added to the agglomerated oxide particles as they are being prepared. By either method, the oxides and grain growth promoters should be thoroughly blended, though the method of admixing is not critical. When added separately, they may be blended, for example, by stirring, tumbling, and like processes.

Oxide Particle Preparation

The oxide particles with which the growth promoting additives are incorporated comprise a major proportion of ferric oxide and a minor proportion of one or more of the divalent metal oxides, strontium oxide, barium oxide and lead oxide. Crystallite growth promoters, as hereinabove descirbed, are added to these particles either when they are being formed or in a second separate step.

The oxide particles contain from about 3 to about 6.5 moles of ferric oxide per mole of divalent metal oxide. Preferably they contain from about 4.5 to about 6.5 moles of ferric oxide per mole of divalent metal oxide, and most preferably from about 5.0 to about 6.5 moles of ferric oxide per mole of barium, strontium and/or lead oxide.

The particles are themselves agglomerates of particles of the two or more metal oxides. With any of these compositions, it is very desirable that these agglomerates be small and it is essential that the particles which make up the agglomerates be very small in size. The agglomerates must be made up of particles of ferric oxide and divalent metal oxide which are less than 0.1 micron in diameter. Excellent results are obtained when the individual oxide particles which make up the agglomerates are less than 0.02 microns in diameter, which is about the smallest size which can be readily measured by present techniques. If particles of growth promoters are incorporated into the oxide particles they should also be of small size, for example, less than 0.1 micron.

Suitable agglomerated particles may be produced by several techniques. In one method, for example, they are prepared by coprecipitating a mixture of decomposable compounds of the metals (and optionally the additives) and then thermally decomposing the precipitate. Other techniques include, for example, spray drying, or spray roasting a mixed salt solution. These methods all lead to very intimately mixed agglomerates of less than 0.1 micron particles of ferric oxide and divalent metal oxides and, if already present, the additives.

Using the coprecipitation technique, a solution, most conveniently in water, of soluble ferric and strontium, barium and/or lead salts and, if desired, additives is first prepared. Examples of suitable salts include ferric chloride, nitrate, acetate, chlorate, formate and oxalate; strontium nitrate, nitrite, chloride and acetate; barium nitrate, chloride, acetate and nitrite; and lead nitrate, nitrite, citrate and acetate. Soluble organic complexes may also be employed. The solution of salts is then treated with a precipitating agent which gives a thermally decomposable precipitate. Examples of suitable precipitating agents are hydroxyl ion, carbonate ion, oxalate ion and the like. Preferred precipitating agents are hydroxide ion and carbonate ion in amounts of from about one to about ten times the stoichiometric amount required for precipitation of all the metal ions present. The preferred lithium and calcium fluoride additives are soluble in acidic aqueous media but precipitate in basic media. Thus, they are well suited for this technique. Some of the other fluorides, i.e., sodium fluoride, are quite soluble in acidic and basic media.

The amount of soluble metal salts present in the aqueous solution is determined by considering the solubilities of the precipitates to ultimately give the desired ferric oxide to divalent metal oxide molar ratio of about six to one and, if present, the additive addition of up to about 6 percent by weight.

The mixed precipitate is separated, rinsed and thermally decomposed in an oxygen-containing atmosphere to give the mixed oxide particles. Generally, an exposure of from about 2 to 36 hours to temperatures in the range of from about 500°C to about 750°C is adequate to carry out the decomposition. Somewhat longer times and higher temperatures may be required with very difficultly decomposed salts; however, long heatings at temperatures of greater than about 750°C should be avoided.

Using the spray-drying technique, a solution is prepared containing a decomposable ferric salt and one or more decomposable salts of strontium, barium and/or lead and, optionally, the additives in the desired about 3:1 to 6.5:1 molar ratio. Suitable salts include nitrates, carbonates, acetates, chlorides and like materials which decompose when heated in the presence of oxygen. The solution is atomized into a chamber maintained at an inlet drying temperature in the range of from about 100°C to about 600°C, preferably from about 200°C to 500°C, to form small, dry particles of mixed decomposable salt. These particles are then thermally decomposed in an oxygen-containing atmosphere. This decomposition step is similar to that described with the coprecipitation method of forming particles and requires similar conditions.

Using the spray-roasting technique, a solution of decomposable salts, optionally including the additives, is prepared and atomized into a chamber or fluidized bed having an oxygen-containing atmosphere heated to a temperature in the range of from 500°C to 1,200°C. In one step the particles of mixed decomposable salts are formed and thermally decomposed to mixed oxides.

While any of these techniques are useful and without intent to limit the scope of this invention, the spray-dry method is preferred as it yields good products in a most simple manner.

The Chemical Reaction

The particulate solid agglomerates produced in the first step contain essentially distinct grains of ferric oxide and distinct grains of the divalent metal oxides and, optionally, the crystallite growth promoters. If not added directly during the oxide particle formation, in a second step crystallite growth promoters are added. In the third step of the process, the mixture of particulate agglomerates and crystallite growth promoter is heated to a relatively low temperature for a relatively long period to cause the separate oxide grains to chemically react and form small crystallites of their respective metal ferrite from which the final ferrite bodies are made. This heating step is referred to herein as ferritizing. These ferrite products can be represented by the formula $MO \cdot Fe_2O_3$ where M is one or more divalent metals of the group strontium, barium and lead and n has a value of from 3 to 6.5 or preferably from 4.5 to 6.5. The crystallites of ferrite produced in this step must on the average be less than 0.5 microns in diameter. The crystallites are uniform in size, preferably having an average diameter of not greater than 0.2 micron with not more than 10 percent of the crystallites having diameters above 0.5 microns.

It is essential that the temperature and period of the heating of this step be closely controlled. The temperature must be maintained high enough to cause the metal oxides to react with one another and form the desired ferrite crystallites. The temperature must not be substantially above the reaction temperature or else, with the crystallite growth promoter being present, particle grain growth will occur. While crystallite growth has been found to be most desirable during the hot-pressing which follows, it is not desirable to have it occur during the ferritization step.

It is not necessary that this ferritization be carried to completion. It is very difficult to achieve complete reaction between the oxides without also obtaining some undesired, premature grain growth. If ferritization is only partially completed in this step, it can be completed by the heat and pressure employed in the final hot-pressing step where any crystallite growth which occurs is desirable.

It is preferred to obtain ferritization partially by heating in this step and partially by heating with pressure in the final hot-pressing step. Temperatures selected in the range of from about 500° to about 900°C are suitable for the ferritization step as are heating periods of from about 0.1 hour to about 24 hours.

The times and temperatures for ferritization are critical and depend upon each other and upon the chemical make-up of the oxide mixture. As a general rule oxide mixtures containing substantial amounts of lead oxide require lower temperatures than do mixtures not containing lead oxide.

With mixtures of ferric oxide and barium and/or strontium oxides, temperatures of from about 700°C to about 900°c are preferred for the ferritization step as are times of from 0.5 to 12 hours. More preferably, the temperature is from about 750°C to about 850°C and the heating period is from 2 to 6 hours.

With mixtures consisting primarily of ferric oxide and lead oxide, temperatures of from 550°C to 750°C are preferred as are times of from 0.5 to 12 hours. More preferably, the temperature is from about 600°C to about 700°C and the heating period is from 2 to 6 hours. The time ranges and temperature ranges given here, and also given below for the hot-pressing step, are not intended to be mutually extensive, but rather to be related. The lower temperatures given will typically require the longer times given, while the highest temperatures will give best results with the shorter times. The other extremes, for example the longest times in combination with the highest temperatures, will generally be less suitable.

Examples of most preferred temperature/time combinations are; for barium and strontium-containing materials 5 to 6 hours at 750°C, 3 to 5 hours at 800°C and 2 to 3 hours at 850°C; and for lead-containing materials 5 to 6 hours at 600°C, 3 to 5 hours at 650°C and 2 to 3 hours at 700°C.

The ferritizing should be carried out in an oxygen-containing atmosphere such as air, most preferably in an atmosphere consisting essentially of oxygen. The reason for this is not fully understood, but it has been found that ferrites which yield superior magnets result when oxygen is present during ferritizing.

The Hot-Pressing

The mixture of small metal ferrite crystallites and crystallite growth promoters is hot-pressed to directly yield a dense solid ferrite body having an oriented microstructure. The oriented microstructure is necessary to yield the desired excellent quality permanent ceramic magnets.

The hot-pressing is carried out, as the name implies, by placing the mixture of ferrite crystallite powder and grain growth promoter in a die and applying heat and pressure. Suitable hot pressing conditions are from 600°C to 1,100 C and from 1,000 psi to 30,000 psi. Use of conditions in this range enable suitable compaction and crystallite orientation to be effected in a total heating cycle of about 10 minutes or less, generally in from 1 to 10 minutes. Higher pressures would be useful but pose a serious cost problem since dies suitable for higher pressures at these temperatures are highly expensive. With barium and strontium oxide containing materials, excellent results are obtained when from 850°C to 1,050°C and from 3,000 psi to 20,000 psi are used. With these materials, 900°C to 1,000°C and 5,000 psi to 10,000 psi are most preferred.

With materials containing predominately lead oxide and ferric oxide excellent results are obtained when from 750°C to 950°C and from 3,000 psi to 20,000 psi are used. With these materials, 800°C to 900°C and 5,000 psi to 10,000 psi are most preferred.

Examples of suitable times, temperatures and pressures to effect hot-pressing with barium and strontium oxide-containing materials are 10 minutes at 900°C and 15,000 psi; 10 minutes at 950°C and 5,000 psi; 3 minutes at 950°C and 20,000 psi; and 1.2 minutes at 1,000°C and 5,000 psi; and with lead-containing materials 10 minutes at 800°C and 5,000 psi; 3 minutes at 850°C and 5,000 psi; and 1.2 minutes at 900°C and 10,000 psi.

The hot-pressing is preferably carried out in an oxygen-containing environment such as air.

The hot-pressing serves several purposes. It forms the powder into a dense solid body as is required for ceramic magnets. It completes the reaction (ferritization) between the ferric oxide and divalent metal oxide(s). It also causes crystallite orientation. It has been found that when crystallite growth promoters are present and pressure is applied crystallite growth takes place preferably in a direction perpendicular to the applied pressure. Because of this preferential growth the crystallites automatically directly orient themselves so that their axes of easy magnetization are all aligned as are their axes of hard magnetization. When a hot-pressed product of this invention is placed in a magnetic field having the same orientation as the alignment of the crystallites' axis of hard magnetization, a strong permanent magnet is formed.

The Metal Ferrite Product

The metal ferrite products formed directly by hot-pressing using the process of this invention have a formula $MO \cdot Fe_2O_3$ wherein M is at least one divalent metal of the group barium, strontium and lead and n has a value of from 3 to 6.5, preferably 4.5 to 6.5 inclusive. They also contain the minor amounts noted hereinabove of added crystallite growth promoters.

The ferrite products are dense and finely grained, and have high degrees of crystallite orientation. The densities of these ferrites are at least 95 percent, preferably at least 96 percent, and most preferably at least 97 percent of the theoretical maximum. The average crystallite size of these ferrites is less than 2.5 microns, preferably in the range of from 0.5 to 2.0 microns and most preferably from 0.6 to 1.5 microns. The crystallites are uniform with not more than 10 percent having diameters of greater than 3 microns. The crystallites of these materials are highly oriented. Suitably at least 90 percent of the crystallites are oriented, with orientations of not less than 95 percent being preferred.

Because of this unique structure, that is a fine grain structure and a high degree of crystallite orientation, these magnets make ceramic magnets which have both high remanences and coercive forces. Barium and strontium ferrite magnets made with this invention generally have remanences of greater than 3,700 gauss and intrinsic coercive forces of greater than 3,700 oersteds. Lead ferrites made by the process of this invention generally have remanences of greater than 3,700 gauss and intrinsic coercive forces of greater than 2,500 oersteds.

The process of this invention will be further described by the following examples, illustrative embodiments and comparative experiments. These are presented for purposes of illustration and are not intended to limit the scope of this invention.

COMPARATIVE EXPERIMENT

The experiment of Example I was repeated with one change. No crystallite growth promoter was added. The final product, when magnetized, had the following properties:

| | | |
|---|---|---|
| Saturation | = | 3220 gauss |
| Remanence | = | 2420 gauss |
| Intrinsic Coercive Force | = | 5360 oersteds |
| Normal Coercive Force | = | 2160 oersteds |
| Orientation | = | 75% |

EXAMPLE II – V

Using the general procedures and starting materials of Example I, a group of related magnets were prepared. The conditions were the same as in Example I with the following changes:

In Example II the hot-pressing temperature was 960°C.

In Example III the hot-pressing temperature was 980°C.

In Example IV the hot-pressing temperature was 940°C and the ferritizing was at 700°C for 6.5 hours.

These ferrites had the following chemical and magnetic properties:

| Example | $Fe_2O_3$/SrO | CaF, %w | Density, % max | Bs | Br | Hci | Hc |
|---|---|---|---|---|---|---|---|
| II | 6 | 1.5 | 97 | 4320 | 4000 | 4360 | 3250 |
| III | 5 | 1 | 96 | 4320 | 3960 | 3940 | 3000 |
| IV | 5 | 1 | 97 | 4200 | 3950 | 4520 | 3380 |
| V | 5 | 1.5 | 96 | 4200 | 3800 | 4500 | 3300 |

EXAMPLE I 908 grams of $Fe(NO_3)_3$ $9H_2O$ and 47.5 grams of $Sr(NO_3)_2$ were dissolved in 3 gallons of water. 4.1 grams of $CaF_2$ dissolved in 250 ml of 6N nitric acid was then added. This solution was dried in a Niro brand portable spraydrier. The spraydrier inlet temperature was 440°C and exit temperature was 160°C. The material from the spraydrier was placed in ceramic crucibles and heated in air to 600°C for 15½ hours to convert to oxides and remove residuals.

The particulate agglomerate consisting of iron oxide, strontium oxide and calcium fluoride was then ferritized by being placed in a rotating furnace at 800°C for four hours in an oxygen atmosphere to form ferrite powder.

The ferrite powder was loaded into a Hastalloy B die and heated to 970°C in air in a split tube furnace. A pressure of 8,000 psi was applied and a solid ferrite billet was formed. This billet was removed and examined. The product containe 5 moles of iron oxide for each contained of strontium oxide. It has a density of 95 percent of the maximum theoretically possible.

| | |
|---|---|
| Saturation (Bs) | = 4400 gauss |
| Remanence (Br) | = 4040 gauss |
| Intrinsic Coercive Force (Hci) | = 3980 oersteds |
| Normal Coercive Force (Hc) | = 3000 oersteds |

These properties indicated that the crystallites were 92 percent oriented.

COMPARATIVE EXPERIMENT

A strontium ferrite was prepared using generally the procedures and feedstocks of Example I. No crystallite growth promoter was added however.

4536 grams of $Fe(NO_3)_3$ $\cdot 9H_2O$ and 221.6 grams of $Sr(NO_3)_2$ were dissolved in 7 gallons of water. This solution was dried in a Niro brand portable spray drier. The inlet temperature was 435°c and outlet temperature was 160°C. The material from the spray drier was placed in ceramic crucibles and heated in air to 600°C for 15½ hours to remove residual nitrates.

To ferritize the material, the crucibles containing the powder were placed in a furnace at 1,000°C for 4 hours in air. The particles of calcined material lumped together somewhat but were easily crushed to pass an 80 mesh sieve.

The ferrite powder was loaded into a Hastalloy B die and then heated to 950°C in air. Applied pressure was about 10,000 psi. The sample was held at temperature for about 3 minutes to effect sintering. The sample was cooled in the furnace and removed. Property measurements on the hot-pressed sample gave the following results:

density = 4.99 g/cc
$B_s$ = 3220 gauss
$B_r$ = 2400 gauss
$H_c$ = 2000 oersteds
$H_{ci}$ = 5080 oersteds The low value for the remanence indicated that little crystallite orientation had occured.

ILLUSTRATIVE EMBODIMENTS

A. $Fe(NO_3)_3$ $9H_2O$ and $Ba(NO_3)_2$ in the molar ratio of 6 to 1 are dissolved in water. This solution is atomized and passed through a tube heated to about 1,000°C. The product of this in spray-roasting treatment is a fine powder of mixed oxide. The powder particles are agglomerates of less than 0.1 micron grains of oxides. 1.5 percent by weight, based on the total composition, of calcium fluoride crystals are added as a crystallite growth promoter and thoroughly admixed. The mixture of calcium fluoride and oxide powder is maintained at about 800°C for about 4 hours in air to permit the two metal oxides to react (ferritize) and form less than 0.1 micron diameter crystallites of barium ferrite. This powder is placed in a die and hot-pressed at 10,000 psi and 950° to 1,000°C for five minutes to give a solid compact having a density of about 95 percent + of theoretical maximum. This body would have grain structure wherein at least 90 percent of the crystals have diameters less than 3 microns. This product would be a highly oriented ferrite, suitable for preparing excellent magnets.

B. $Fe(NO_3)_3 \cdot 9H_2O$ and $Pb(NO_3)_2$ in the molar ratio of 6 to 1 are dissolved in water. 1 percent by weight (basis oxides) of calcium fluoride is added in nitric acid. This solution is atomized and passed through a tube heated to about 800°C. The product of this spray-roasting treatment is a fine powder of mixed lead and ferric oxides. The powder particles are agglomerates of less than 0.1 micron crystal of oxides. The mixture of promoter and mixed oxide powder is maintained at about 700°C for about 4 hours to permit the two metal oxides to react (ferritize). This mixture is placed in a die and hot-pressed at 10,000 psi and 800°c for 1.2 minutes to give a solid compact having a density of about 95 percent+ of theoretical maximum. This body would have grain structure wherein at least 90 percent of the crystals have diameters of less than 3.0. This product would be a highly oriented ferrite, suitable for preparing excellent magnets.

C. The experiments of Examples I – V and illustrative Embodiments A and B are repeated employing as crystallite growth promoter lithium fluoride. Similar products, directly having an oriented crystallite structure, are produced.

We claim as our invention:

1. The process for preparing a metal ferrite of the formula $MO \cdot nFe_2O_3$ wherein M is at least one divalent metal selected from the group consisting of barium, strontium and lead and n has a value of from 3 to 6.5, said ferrite having improved physical and magnetic properties, which consists essentially of the steps:
    a. preparing an admixture of solid particles comprising intimate agglomerates of (1) one mole of less than 0.1 micron grains of at least one oxide selected from the group consisting of barium oxide, strontium oxide and lead oxide and (2) from 3 to 6.5 moles of less than 0.1 micron grains of ferric oxide, with from about 0.1 to about 6 percent by weight of at least one metal fluoride of the Group IA and Group IIA metals of atomic number 3 through 56 of the Periodic Table;
    b. heating said mixture at about 500°C to 900°C for not more than 24 hours, thereby forming crystallites of divalent metal ferrite; and
    c. hot-pressing the metal ferrite composition of (b) at from 600°C to 1,100°C and at from 1,000 to 30,000 psi directly into a solid metal ferrite body having a density of at least 95 percent of theoretical and crystallites having a uniform average size of less than 3 microns and an orientation of at least 90 percent.

2. The process of claim 1 wherein the divalent metal is barium or strontium.

3. The process of claim 2 wherein in step (b), the mixture is heated from 700°c to 900°C for from 0.5 to 12 hours in an oxygen-containing atmosphere.

4. The process of claim 2 wherein in step (c), the ferrite composition is hot-pressed at from 850°C to 1,050°c at from 3,000 to 20,000 psi in an oxygen-containing atmosphere.

5. The process of claim 4 wherein the metal fluoride is present in an amount of from 0.25 to 2 percent by weight.

6. The process of claim 5 wherein the divalent metal is strontium or barium and n has a value of from 4.5 to 6.5.

7. The process of claim 6 wherein in step (b), the mixture is heated from about 750°C to about 850°C for from 2 to 6 hours in an atmosphere essentially of oxygen; and in step (c) the ferrite composition is hot-pressed at 900°C to 1,000°C at from about 5,000 to about 10,000 psi in air.

8. The process in accordance with claim 7 wherein the metal fluoride is calcium fluoride or lithium fluoride.

9. The process of claim 1 wherein the divalent metal is lead.

10. The process of claim 9 wherein in step (b) the mixture is heated at from 550°C to 750°C for from 0.5 to 12 hours in an oxygen-containing atmosphere; and in step (c) the ferrite composition is hot-pressed at 750°C to 950°C for from about 3,000 to 20,000 psi in an oxygen-containing atmosphere.

11. The process of claim 10 wherein the metal fluoride is present in an amount of from 0.25 to 2 percent by weight and n has a value of from 4.5 to 6.5.

12. The process of claim 10 wherein in step (b) the mixture is heated from about 600°C to about 700°C for from 2 to 6 hours in an atmosphere essentially of oxygen; and in step (c) the ferrite composition is hot-pressed from about 800°C to 900°C at from about 5,000 psi to about 10,000 psi in air.

13. The process of claim 12 wherein the metal fluoride is calcium fluoride.

14. The process of claim 12 wherein the metal fluoride is lithium fluoride.

* * * * *